Patented June 22, 1948

2,443,919

UNITED STATES PATENT OFFICE 2,443,919

FERMENTATION PROCESS FOR PRODUCTION OF α-KETOGLUTARIC ACID

Lewis B. Lockwood and Frank H. Stodola, Peoria, Ill., assignors to the United States of America as represented by the Secretary of Agriculture No Drawing. Application August 9, 1946, Serial No. 689,349

9 Claims. (Cl. 195—30)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a method for the preparation of ketodicarboxylic acids, more specifically, α-ketoglutaric acid, and more particularly to a method for the preparation, by fermentation, of a valuable material which finds use as an intermediate in the preparation of indoleacetic acid, a plant hormone which finds extensive application in agricultural practice.

The production of α-ketoglutaric acid in biological systems has been known for several years. Westerkamp (Biochem. Z. 36:239 (1933)) reported α-ketoglutaric acid in blood serum, and Evans (Biochem. J. 34:829 (1940)) found that α-ketoglutarate was produced by the enzymes of minced pigeon liver acting on pyruvate. Damodaran and Nair (Biochem. J. 32:1064 (1938)) found an enzyme system for converting glutamic acid to α-ketoglutaric acid in *Phaseolus mungo, P. radiatus* and *Pisum sativum.* In none of the cases reported in the literature has α-ketoglutaric acid been isolated from the culture solution of a microorganism in such quantity as to indicate that it is one of the major products of carbohydrate metabolism, or to represent a practical process for producing this acid or its salts.

In contrast to the prior art, we have found that if suitable bacteria are cultivated submerged in nutrient solutions containing glucose or other suitable carbohydrates, or gluconate salts or 2-oxo-gluconate salts and if the system is aerated with gases containing oxygen, such as air, at atmospheric pressure, or preferably at superatmospheric pressure, the system at the same time being agitated by various means, a rapid and efficient conversion of the substrate to α-ketoglutaric acid occurs. In contrast to the previous reports of the finding of very small quantities or traces of α-ketoglutaric acid in enzyme systems acting upon pyruvate or amino acids, we have found that yields of α-ketoglutaric acid of 16.8 g. per 100 g. glucose supplied can be obtained by the application of our invention. A further advantage of our invention is that we are not restricted to amino acids or pyruvic acid as substrates, but we may use glucose or other carbohydrate materials containing glucose (as a component of the sugar molecule), as maltose, dextrins, starch, molasses, grain mashes and the like, or salts of gluconic or 2-oxo-gluconic acids, or crude solutions or mashes containing these salts. We have found that suitable strains of bacteria of the Pseudomonas genus possess the ability to produce α-ketoglutaric acid from the above-mentioned substrates, when cultivated according to the method herein set forth.

Our invention has still another advantage in that the resulting α-ketoglutaric acid can be readily precipitated as the calcium salt from the filtered culture liquor, by letting stand 24 hours or cooling to about 10° C. It is difficult to remove the impurities and precipitate the α-ketoglutarate when recoveries are made from crude vegetable or animal sources.

The production of the industrially important 2-oxo-gluconic acid from glucose by bacteria of the genus Pseudomonas was detailed by Lockwood, Ward, Stubbs, Roe, and Tabenkin (United States Patent 2,277,716). In its preferred form our invention differs from their art in that the fermentation is continued until all materials capable of reducing Fehling's solution have been destroyed and that α-ketoglutaric acid is the product of our invention instead of 2-oxo-gluconic acid (2-ketogluconic acid).

In the cited art the major product, 2-oxo-gluconic acid, remaining at the end of the fermentation, is capable of reducing Fehling's solution. In our invention there is no 2-oxo-gluconic acid present at the end of the fermentation period.

In our invention, agitation of the system may be effected by blowing air through the mass, or by propellers, or by revolving the fermenter, or by other means which will occur to those skilled in the art. The exact apparatus used to effect agitation is not critical, the important factor being the intimate contacting of the bacterial cells, the substrate, the neutralizing agent, and the gas used for aeration.

We have found that aeration of the mash is necessary to obtain a rapid oxidation of the substrate to α-ketoglutaric acid. Such aeration may be applied at atmospheric pressure, or preferably at superatmospheric pressure. We have found that operating at superatmospheric pressure results in a more rapid conversion of substrate to product.

We have found it desirable to conduct our fermentation at temperatures between 15° C. and 50° C., the range from 20° C. to 30° C. being especially suitable.

As typical apparatus within which our process may be successfully conducted, we cite the Jena glass gas-washing bottles (type 101A) used by May, Herrick, Moyer, and Wells for the production of gluconic acid by mold fermentation (Ind. Eng. Chem. 26:575 (1934)); the rotary aluminum fermenter developed by Herrick, Hellbach, and May for the industrial application of submerged mold fermentations (Ind. Eng. Chem. 27:681 (1935)); and vertical vat fermenters in common use in the art. We do not wish to restrict our invention as to equipment used, since numerous modifications and adaptations are possible and will be readily apparent to those skilled in the art.

Considerable latitude is possible in the selection of nutrients to be used in performing our invention. Although we prefer to use corn steep liquor, magnesium sulfate and potassium phosphate, as cited hereafter in Example 1, it is possible to secure good results if some of these components are omitted or varied as to the quantity used. Thus, satisfactory fermentations can be obtained upon omitting or varying the urea, magnesium sulfate and potassium phosphate, if the quantity of corn steep liquor be suitably altered. Similarly, if urea and the above-mentioned inorganic salts be supplied in the quantities given in Example 1, the corn steep liquor may be reduced in quantity or even entirely eliminated without noticeably affecting the fermentation. We, accordingly, do not wish to be restricted as to the nutrient components, since many variations will be apparent to those skilled in the art. Likewise, we do not wish to restrict ourselves as to the use of calcium carbonate as the neutralizing agent, since the substitution of quicklime, zinc carbonate, and other similar substances will readily occur to those skilled in the art.

The following examples illustrate representative procedures used in practicing our invention:

Example 1

An aqueous fermentation medium of the following composition was used:

| | Grams per liter of medium |
|---|---|
| Glucose | 100.00 |
| Corn steeping liquor | 5.00 |
| Lardoil | 5.00 |
| Urea | 2.00 |
| $MgSO_4 \cdot 7H_2O$ | 0.25 |
| $KH_2PO_4$ | 0.60 |
| $CaCO_3$ | 27.00 |

3000 cc. of this sterile medium was inoculated with 100 cc. of an active culture of *Pseudomonas fluorescens* and placed in a rotary drum fermenter. Air at atmospheric pressure was passed through the fermenter at a rate of 1600 cc. per minute, the solution was agitated by revolving the drum 13 revolutions per minute, and the temperature of the system was maintained at approximately 25° C. The course of the fermentation was followed by periodic analysis. After 48 hours, the rate of air flow was reduced to 600 cc. air per minute. After 110 hours, the solution contained α-ketoglutaric acid (calcium salt) in a quantity equivalent to a 10.0 percent yield based on the glucose available. The product was identified as the 2,4-dinitrophenyl hydrazone (M. P. 226° C.).

Example 2

The same materials and conditions were used as in Example 1, except that the process was conducted under increased air pressure, a gage pressure of 30 lb. per square inch being maintained. After 112 hours, the medium contained α-ketoglutaric acid (calcium salt) in a quantity equivalent to 16.8 percent yield based on the glucose available

Example 3

Using the same medium and culture conditions that were used in Example 1, and a 2-oxo-gluconic acid producing strain of Pseudomonas, the fermentation was conducted according to the teachings of Lockwood, Ward, Stubbs, Roe, and Tabenkin (United States Patent 2,277,716) until a yield of 2-oxo-gluconic acid (calcium salt) equivalent to a 73 percent weight yield based on glucose available was obtained. Analyses at this time demonstrated the absence of α-ketoglutaric acid. Thence, the fermentation was continued until all the calcium 2-oxo-gluconate had been metabolized, one of the principal metabolic products obtained from the calcium 2-oxo-gluconate being calcium α-ketoglutarate, which was present in the fermented liquor in a quantity equivalent to a 23.1 percent yield based on the 2-oxo-gluconate acid (calcium salt) available.

Having thus described our invention, we claim:

1. A process for the production of α-ketoglutaric acid which comprises inoculating with bacteria of the genus Pseudomonas a nutrient medium containing a soluble gluconate salt and containing a neutralizing agent; aerating and agitating the inoculated medium, while cultivating the bacteria in a submerged state, and continuing the cultivation beyond the stage in which 2-ketogluconic acid is produced and until the 2-ketogluconic acid is substantially metabolized, thereby producing α-ketoglutaric acid.

2. A process for the production of α-ketoglutaric acid, which comprises inoculating with bacteria of the genus Pseudomonas a nutrient medium containing a soluble 2-ketogluconate salt and containing a neutralizing agent, aerating and agitating the inoculated medium while cultivating the bacteria in a submerged state, and continuing the cultivation until the 2-ketogluconic acid is substantially metabolized, thereby producing α-ketoglutaric acid.

3. A process for the production of α-ketoglutaric acid which comprises inoculating with bacteria of the species *Pseudomonas fluorescens* a nutrient medium containing calcium 2-ketogluconate, aerating and agitating the inoculated mash while maintaining the same under superatmospheric pressure of gases containing substantial quantities of oxygen, and cultivating the bacteria in a submerged state, and continuing the cultivation until the 2-ketogluconic acid is substantially metabolized, thereby producing α-ketoglutaric acid.

4. A process for producing α-ketoglutaric acid comprising cultivating a bacteria of the species *Pseudomonas fluorescens* in a submerged state in a nutrient medium containing glucose and a neutralizing agent, aerating and agitating the medium, and continuing the cultivation until the 2-ketogluconic acid is substantially metabolized, and recovering the α-ketoglutaric acid values from the medium.

5. A process for producing α-ketoglutaric acid, comprising cultivating a bacteria of the species *Pseudomonas fluorescens* in a submerged state in a nutrient medium containing a sugar having glucose as a component of the molecule, and containing a neutralizing agent; aerating and agitating the medium; continuing the cultivation until the 2-ketogluconic acid formed is substantially metabolized; and recovering the α-ketoglutaric acid values from the medium.

6. A process for producing α-ketoglutaric acid, comprising cultivating a bacteria of the species Pseudomonas in a submerged state in a nutrient medium containing a compound taken from the group consisting of those having glucose as a component of the molecule and which are from the group consisting of starches and sugars, and 2-ketogluconate salts and salts of gluconic acid; and containing a neutralizing medium; aerating and agitating the medium; continuing the cultivation until the 2-ketogluconic acid formed is substantially metabolized; and recovering the α-ketoglutaric acid values from the medium.

7. The process of claim 4 in which the neutralizing agent is calcium carbonate.

8. The process of claim 6 in which the culture is maintained under superatmospheric pressure of gases containing substantial quantities of oxygen.

9. The process of claim 6 in which the bacteria is a species of *Pseudomonas fluorescens*.

LEWIS B. LOCKWOOD.
FRANK H. STODOLA.

REFERENCES CITED

The following references are of record in the file of this patent:

UNITED STATES PATENTS

| Number | Name | Date |
|---|---|---|
| 2,277,716 | Lockwood et al. | Mar. 31, 1942 |